US 8,679,441 B2

(12) United States Patent
Mahieu et al.

(10) Patent No.: US 8,679,441 B2
(45) Date of Patent: Mar. 25, 2014

(54) METHOD OF OPTIMIZING THE CONTROL OF A FUME TREATMENT CENTRE FOR A CARBON BLOCK BAKING RING FURNACE

(75) Inventors: Pierre Mahieu, Lyons (FR); Thierry Malard, L'isle-adam (FR)

(73) Assignees: Solios Environnement, Saint Germain en Laye (FR); Solios Carbone, Givors (FR)

( * ) Notice: Subject to any disclaimer, the term of this patent is extended or adjusted under 35 U.S.C. 154(b) by 747 days.

(21) Appl. No.: 12/663,700

(22) PCT Filed: May 27, 2008

(86) PCT No.: PCT/FR2008/050920
§ 371 (c)(1),
(2), (4) Date: Jun. 7, 2010

(87) PCT Pub. No.: WO2009/000992
PCT Pub. Date: Dec. 31, 2008

(65) Prior Publication Data
US 2010/0254874 A1 Oct. 7, 2010

(30) Foreign Application Priority Data

Jun. 21, 2007 (FR) ...................................... 07 04432

(51) Int. Cl.
*C01B 31/18* (2006.01)
*B01D 53/14* (2006.01)
*B01D 47/00* (2006.01)
*C01B 31/20* (2006.01)
*C01B 31/02* (2006.01)

(52) U.S. Cl.
USPC ..................... 423/418.2; 423/246; 423/437.2; 423/459; 110/186

(58) Field of Classification Search
None
See application file for complete search history.

(56) References Cited

U.S. PATENT DOCUMENTS 4,568,272 A * 2/1986 Oderbolz et al. ............... 432/17
4,859,175 A 8/1989 Dreyer et al.
(Continued)

FOREIGN PATENT DOCUMENTS

DE  40 02 554  8/1991
DE  43 38 928  5/1995
(Continued)

OTHER PUBLICATIONS

French Preliminary Search Report, for Application No. PCT/FR2008/050920, mailed Nov. 5, 2008, 6 pages.

*Primary Examiner* — Melvin C Mayes
*Assistant Examiner* — Sheng H Davis
(74) *Attorney, Agent, or Firm* — Seed IP Law Group PLLC

(57) ABSTRACT

The invention relates to a method for controlling a fume treatment center (FTC) (23), scrubbing the baking fumes from a rotary baking furnace (1), in which the fumes are drawn in through at least one suction manifold (11) of the baking furnace (1) and collected in a duct (20, 20') that conveys said fumes to the fume treatment center (23). The fume treatment center includes a tower (24) which sprays water into the fumes in order to cool same and a least one reactor (25) for the physico-chemical neutralization of the fumes, comprising contact with a reagent powder, such as alumina, followed by filtering (36) of the loaded reagent and the fume dust and recycling in the reactor (25) of at least one fraction of the filtered reagent and mixing of the same with fresh reagent. The method includes at least the following steps: the flow of water in the cooling tower (24) is adjusted and/or the flow and/or recycling rate of the reagent in the reactor (25) is adjusted as a function of at least one parameter indicating the level of pollution of the fumes at the inlet of the fume treatment center (23). The invention can be used for baking carbon cathodes and anodes for aluminum electrolysis.

26 Claims, 7 Drawing Sheets

(56) References Cited

U.S. PATENT DOCUMENTS

Figure 1:
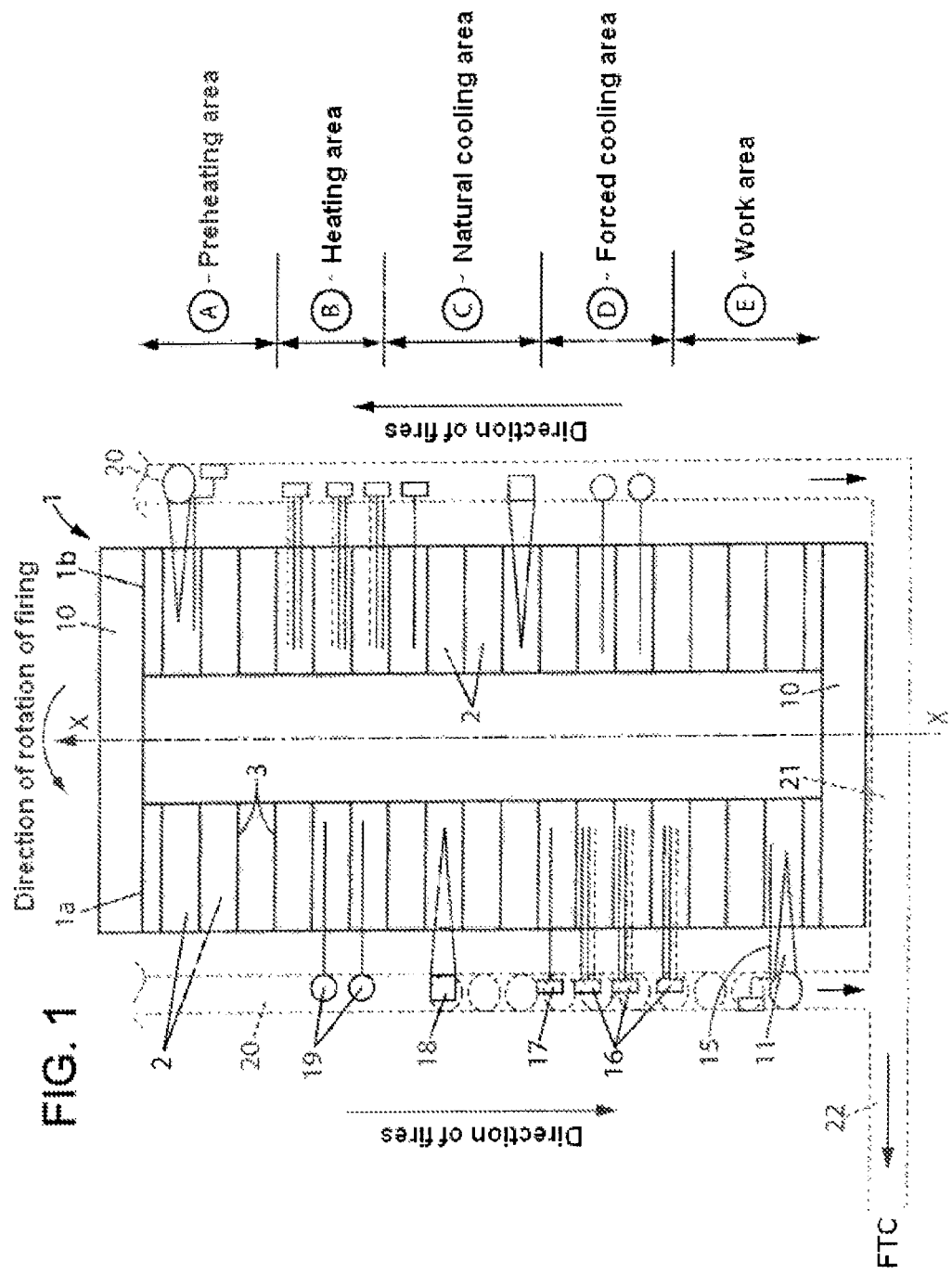

| | | | |
|---|---|---|---|
| 5,013,336 A * | 5/1991 | Kempf et al. | 95/275 |
| 5,137,704 A * | 8/1992 | Eschenburg | 423/235 |
| 6,339,729 B1 | 1/2002 | Dreyer et al. | |
| 6,436,335 B1 | 8/2002 | Leisenberg | |
| 7,581,946 B2 * | 9/2009 | Donnelly et al. | 431/76 |
| 2003/0129077 A1* | 7/2003 | Koch et al. | 420/542 |
| 2004/0020786 A1* | 2/2004 | LaCamera et al. | 205/393 |
| 2005/0103159 A1* | 5/2005 | Ducrocq | 75/385 |
| 2005/0238549 A1* | 10/2005 | Hammel | 422/168 |
| 2007/0065766 A1 | 3/2007 | Mnikoleiski et al. | |
| 2008/0196545 A1* | 8/2008 | Fruehan | 75/10.27 |

FOREIGN PATENT DOCUMENTS

| | | | |
|---|---|---|---|
| EP | 0 252 856 | | 1/1988 |
| EP | 0849587 | * | 6/1998 |
| EP | 1 742 003 | | 1/2007 |
| FR | 2 887 782 | | 1/2007 |
| WO | 91/19147 A1 | | 12/1991 |
| WO | 9615846 | * | 11/1995 |

* cited by examiner

METHOD OF OPTIMIZING THE CONTROL OF A FUME TREATMENT CENTRE FOR A CARBON BLOCK BAKING RING FURNACE

The invention relates to the field of baking carbonaceous blocks intended for electrometallurgy, and more particularly baking carbon anodes and cathodes intended for the electrolytic production of aluminium, and the invention relates more particularly to a method of optimizing the control of a fume treatment centre, hereafter referred to as FTC, intended for scrubbing the baking fumes originating from a baking furnace, hereafter referred to as BF, for said carbonaceous blocks, the BF being a baking furnace of the "ring" type and, preferably, "open top" or "closed", the baking fumes of which are extracted by at least one exhaust manifold of the BF and collected in a fume main conveying the fumes to the FTC.

The FTC is also of a well known type, comprising a tower for cooling fumes by spraying water into said fumes at the outlet of said fume main, and at least one reactor for the physico-chemical neutralization of the fumes by putting the fumes in contact with a powder reagent, such as alumina, then filtering the loaded reagent, in particular by adsorption of fluorinated compounds following contact with the fumes and filtration of the fume dust, and recycling in said reactor of at least one fraction of the filtered reagent and mixing of this with fresh reagent.

It is known that the anodes and cathodes used for aluminium electrolysis are carbon blocks necessary to the chemical reaction of electrolysis of alumina ($Al_2O_3$) in order to obtain aluminium (Al). The base materials used in the production of such anodes or cathodes are calcined petroleum coke constituting the aggregates, and coal pitch, used as a liquid binder. Green blocks are first produced by intensive mixing of the base materials and compaction in order to shape the paste formed from these two main constituents and then baked for approximately one hundred hours at a temperature of the order of 1100° C. The effect of this heat treatment is to transform the pitch into coke and consequently to confer on the anodes and cathodes satisfactory mechanical resistance and electrical conductivity for their use in an electrolysis cell.

These green carbonaceous blocks are baked in baking furnaces of a well-known type, called "ring pit furnace" or "ring furnace", which are used so as to implement the principle of a counter-current gas-solid heat exchanger.

Baking furnaces (BF) for anodes are described in particular in the following patent documents: U.S. Pat. No. 4,859,175, WO 91/19147, U.S. Pat. No. 6,339,729, U.S. Pat. No. 6,436,335 and CA 2 550 880, to which reference will be made for further details in this regard. A reminder of their structure and operation will nevertheless be given, with reference to FIGS. 1 and 2 hereafter, representing respectively a diagrammatic plan view of the structure of an open top ring furnace, having two fires in this example, for FIG. 1, and a partial perspective view with cutaway, showing the internal structure of such a furnace, for FIG. 2.

The baking furnace (BF) 1 comprises two parallel shells or sections 1a and 1b, extending along the longitudinal axis XX over the length of the furnace and each comprising a succession of transverse chambers 2 (perpendicular to the axis XX), separated from each other by transverse walls 3. Lengthwise, i.e. in the transverse direction of the furnace 1, each chamber 2 is constituted by alternately juxtaposed pits 4, open at their upper part in order to allow for the loading of the carbonaceous blocks to be baked and the unloading of the cooled baked blocks, and in which the carbonaceous blocks 5 are stacked for baking, packed in a carbonaceous powder, and thin heating flue walls 6. The flue walls 6 of a chamber 2 run on longitudinally (parallel to the major axis XX of the furnace 1) from the flue walls 6 of the other chambers 2 of the same section 1a or 1b and the flue walls 6 communicate with each other by apertures 7 in the upper part of their longitudinal walls, opposite longitudinal passages arranged at this level in the transverse walls 3, such that the flue walls 6 form rows of longitudinal walls, arranged parallel to the major axis XX of the furnace and in which gaseous fluids (combustion air, combustible gases and combustion gases and fumes) will flow, making it possible to ensure the preheating and baking of the anodes 5, then their cooling. The flue walls 6 comprise moreover a device 8 for extending and more uniformly distributing the path of the combustion gases or fumes, and these flue walls 6 are provided, in their upper part, with openings 9, called "ports", capable of being closed by removable covers.

The two sections 1a and 1b of the furnace 1 communicate at their longitudinal ends by crossovers 10, which make it possible to transfer the gaseous fluids from one section to the other, and sometimes even from the end of each row of flue walls 6 of one section 1a or 1b to the end of the corresponding row of flue walls 6 of the other section 1b or 1a.

The operating principle of ring furnaces, also called "fire advance furnaces" consists of causing a flame front to move from one chamber 2 to another that is adjacent thereto during one cycle, each chamber 2 successively undergoing phases of preheating, forced heating, full firing, then cooling (natural then forced).

Baking of the anodes 5 is carried out by one or more fires or fire groups, which move cyclically from chamber to chamber (in the direction indicated by the arrows) as shown in FIG. 1 (two fire groups being shown). Each fire or fire group is made up of five successive areas A to E, which are as shown in FIG. 1, from downstream to upstream in relation to the direction of flow of the gaseous fluids in the rows of flue walls 6, and in the opposite direction to the cyclical chamber-to-chamber movements:

A) A preheating area comprising, with reference to the fire of section 1a and taking account of the direction of rotation of firing indicated by the arrow at the level of the crossover 10 at the end of furnace 1 at the top of FIG. 1:

an exhaust manifold 11 equipped, for at least one flue wall 6 of the chamber 2 above which this exhaust manifold extends, with an analyser-detector of the carbon monoxide (CO) content of the fumes collected in the exhaust manifold 11, as well as a system for measuring and regulating the flow rate of the combustion gases and fumes by row of flue walls 6, this system being capable of comprising, in each exhaust pipe 11a which is integral with the exhaust manifold 11 and opening out into the latter on the one hand, and on the other hand engaged in the opening 9 of one respectively of the flue walls 6 of this chamber 2, an adjustable flap pivoted by a flap actuator in order to adjust the flow rate, as well as a flow meter 12, for example of the "Venturi tube" type, optionally in this location, in the corresponding pipe 11a, a temperature sensor (thermocouple) 13 for measuring the temperature of the combustion fumes at the exhaust, and a CO analyser-detector 14; and a preheating measurement ramp 15, situated upstream of the exhaust manifold 11, generally above the same chamber 2, and equipped with temperature sensors (thermocouples) and pressure sensors for measuring the static negative pressure and the temperature prevailing in each of the flue walls 6 of this chamber in order to be able to display and regulate such negative pressure and temperature of the preheating area;

B) A heating area comprising:
several identical heating ramps 16, two or preferably three, as shown in FIG. 1; each equipped with fuel injectors (liquid or gaseous), optionally burners, and temperature sensors (thermocouples), each of the ramps 16 extending above one of the chambers respectively of a corresponding number of adjacent chambers 2, such that the injectors of each heating ramp 16 are engaged in the openings 9 of the flue walls 6 in order to inject the fuel therein;

C) A blowing or natural cooling area comprising:
a so-called "zero point" ramp 17, extending above the chamber 2 immediately upstream of the one below the furthest upstream heating ramp 16, and equipped with pressure sensors for measuring the static pressure prevailing in each of the flue walls 6 of this chamber 2, in order to be able to adjust this pressure as indicated hereafter, and a blowing ramp 18, equipped with electric fans provided with a device allowing for the adjustment of the flow of ambient air blown into each of the flue walls 6 of a chamber 2 upstream of the one situated under the zero point ramp 17, so that the flows of ambient air blown into these flue walls 6 can be regulated so as to obtain a desired pressure (slight positive or negative pressure) at the zero point ramp 17;

D) A forced cooling area, which extends typically over three chambers 2 upstream of the blowing ramp 18, and which comprises, in this example, two parallel cooling ramps 19, each equipped with electric fans and blowing pipes blowing ambient air into the flue walls 6 of the corresponding chamber 2; and E) A work area, extending upstream of the cooling ramps 19 and allowing for the loading and unloading of the anodes 5, and the maintenance of the chambers 2.

The heating of the furnace 1 is thus ensured by the heating ramps 16, the injectors of which are introduced, via the apertures 9, into the flue walls 6 of the chambers 2 concerned. Upstream of the heating ramps 16 (relative to the direction of fire advance and the direction of circulation of the air and combustion gases and fumes in the rows of flue walls 6), the blowing ramp 18 and the cooling ramp(s) 19 comprise pipes blowing in cooling and combustion air fed by the electric fans, these pipes being connected, via the apertures 9, to the flue walls 6 of the chambers 2 concerned. Downstream of the heating ramps 16, the exhaust manifold 11 is provided for extracting the combustion gases and fumes, denoted as a whole by the term "combustion fumes", circulating in the rows of flue walls 6.

The heating and baking of the anodes 5 are carried out both by combustion of the (gaseous or liquid) fuel injected, in a controlled fashion, by the heating ramps 16, and, to a substantially equal extent, by the combustion of volatile components of pitch (such as polycyclic aromatic hydrocarbons) diffused by the anodes 5 in the pits 4 of the chambers 2 in preheating and heating areas, these volatile components, a large part of which is combustible, diffused in the pits 4, being capable of flowing in the two adjacent flue walls 6 through degassing gaps arranged in these flue walls in order to ignite in these two flue walls, using the residual combustion air present at this level in the combustion fumes in these flue walls 6.

Thus the circulation of the air and combustion fumes takes place along the rows of flue walls 6, and a negative pressure imposed downstream of the heating area B by the exhaust manifold 11 at the downstream end of the preheating area A makes it possible to control the flow of combustion fumes inside the flue walls 6, while a part of the air originating from the cooling areas C and D, via the cooling ramps 19, and the blown air originating from the blowing ramp 18 is preheated in the flue walls 6, cooling the baked anodes 5 in the adjacent pits 4 on its journey, and acts as an oxidant when it reaches the heating area B.

As the baking of the anodes 5 progresses, all of the manifolds and ramps 11 to 19 (with the exception of the two heating ramps that are upstream relative to the direction of the fire) and the associated measurement and recording equipment and apparatus are advanced cyclically (for example approximately every 24 hours) by one chamber 2, each chamber 2 thus successively providing, upstream of the preheating area A, a function of charging the green carbonaceous blocks 5, then, in the preheating area A, a function of naturally preheating the blocks 5 by the fuel combustion fumes and pitch vapours that leave the pits 4, entering the flue walls 6, taking account of the negative pressure in the flue walls 6 of the chambers 2 in preheating area A, then, in the heating area B or baking area, a function of heating the blocks 5 to approximately 1100° C., and finally, in the cooling areas C and D, a function of cooling the baked blocks 5 by ambient air and, correspondingly, preheating this air constituting the oxidant of the furnace 1, the forced cooling area D being followed, in the direction opposite to the direction of fire advance and circulation of the combustion fumes, by an unloading area E of the cooled carbonaceous blocks 5, then optionally loading of the green carbonaceous blocks in the pits 4.

The method of regulating the BF 1 essentially comprises regulating the temperature and/or pressure of the preheating A, heating B and blowing or natural cooling C areas of the furnace 1, as well as steps of optimization of combustion by adjustment of the injection of the fuel by the heating ramps 16, depending on the CO content of the combustion fumes, as measured in the exhaust manifold 11 by the aforementioned CO detectors 14.

In order to ensure the control and monitoring of the BF 1, the command and control system of the latter can comprise two levels. The first can extend to the set of manifolds and ramps 11 to 19, equipped with sensors and actuators driven by programmable logic controllers, as well as a workshop local network for communication between the logic controllers, as well as for data exchange between the first level and the second, which comprises a central system of computers with their peripheral devices, allowing for communication with the first level, supervision of all of the fires, central regulation of the BF 1, entry of set point rules, management of baking data histories, event management, and storage and production of end-of-baking reports.

Each fire is regulated by row of flue walls 6 from the blowing ramp 18 to the exhaust manifold 11, and, for each row of flue walls 6, the regulation is for example carried out by a regulator of the PID (proportional-integral-derivative) type.

Figure 2:
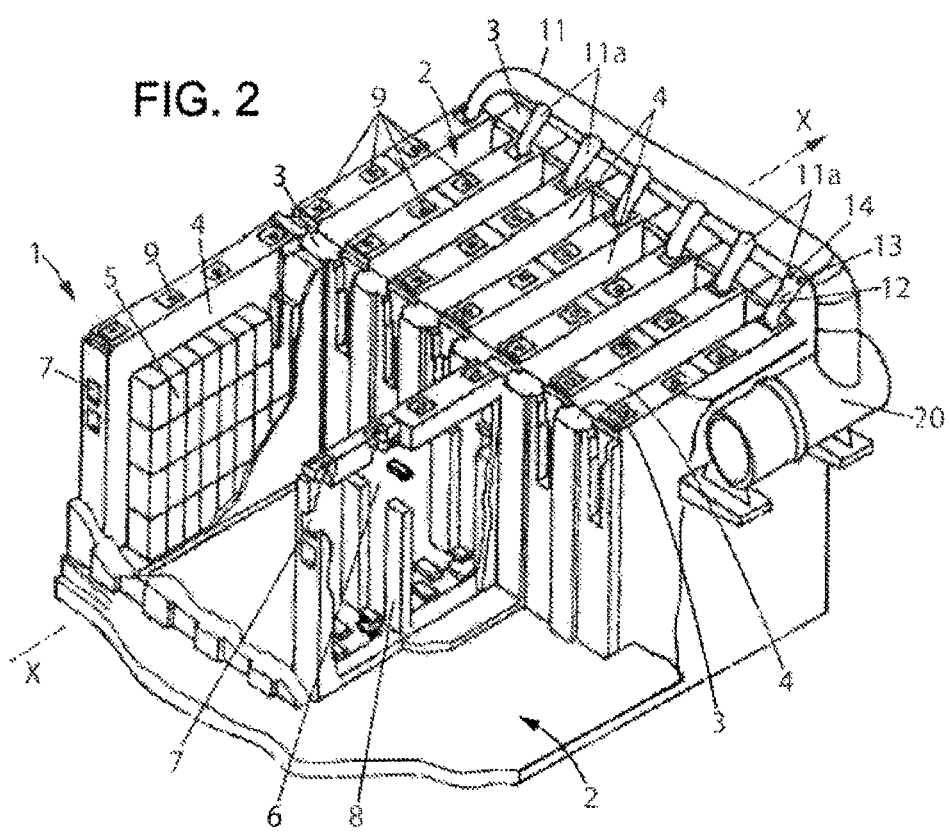
Figure 3:
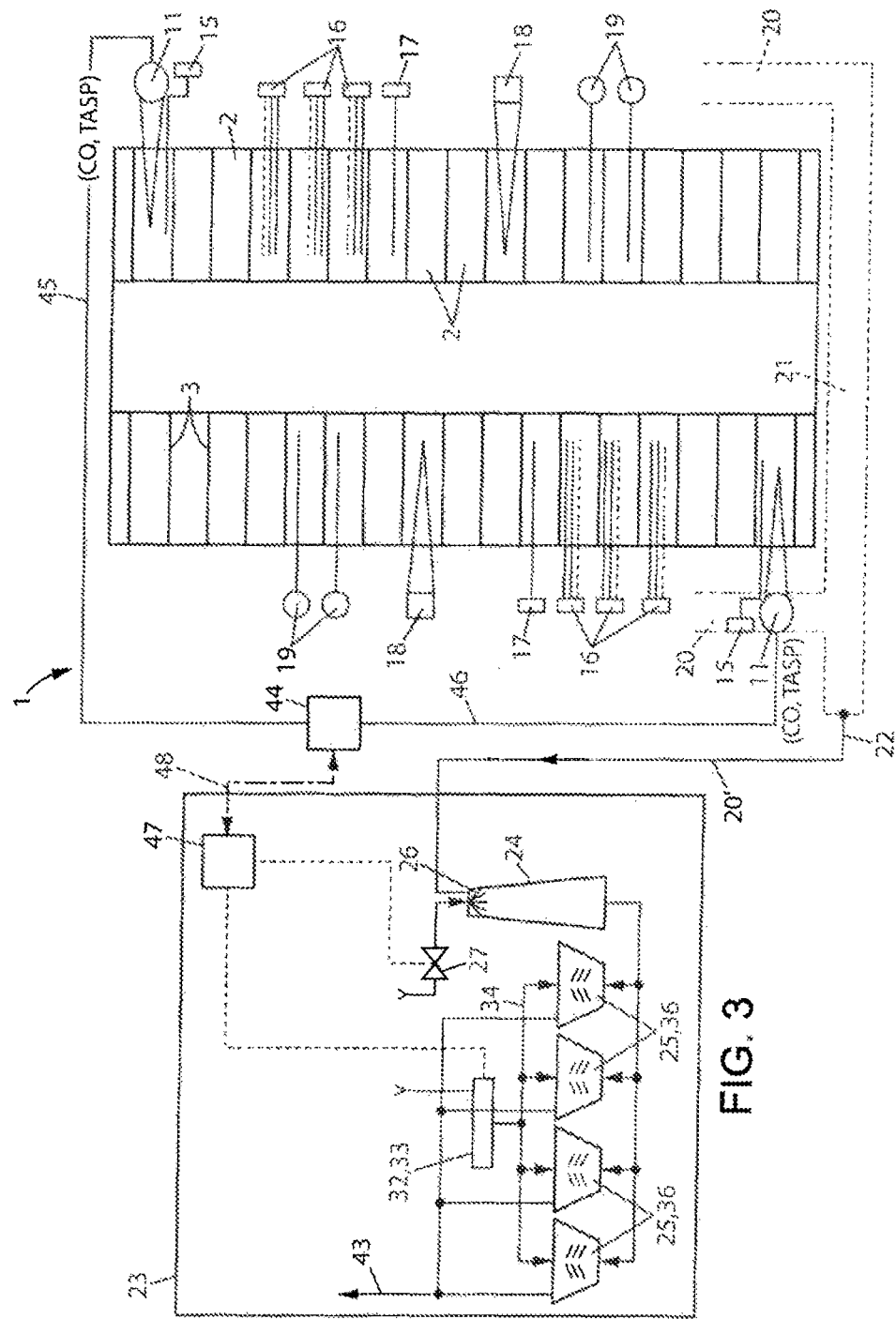
Figure 4:
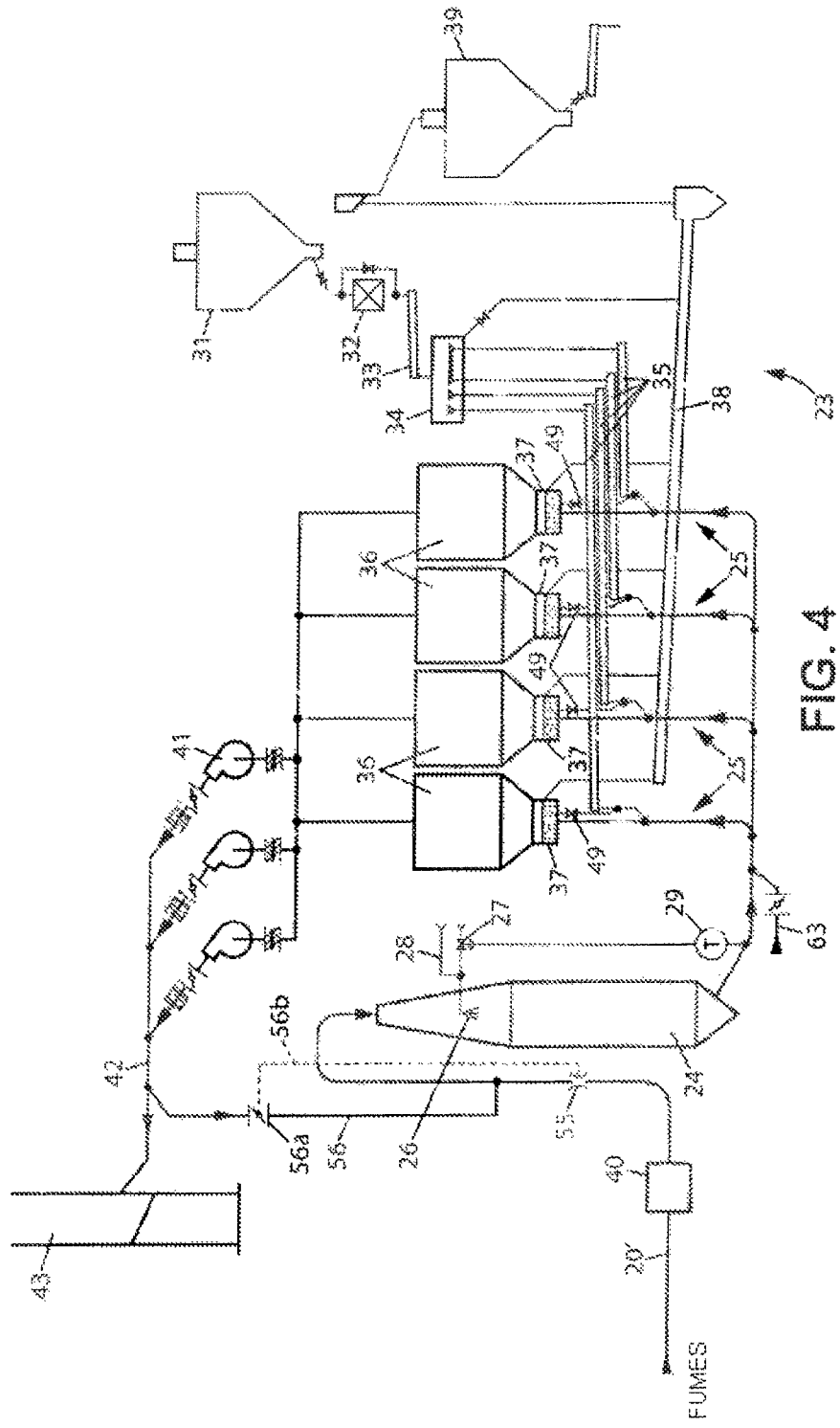

The combustion fumes extracted from the fires by the exhaust manifolds 11 are collected in a fume main 20, for example a cylindrical flue partially shown in FIG. 2, with a fume flue 21 which can be U-shaped in plan view (shown in dotted lines in FIG. 1) or which can surround the furnace, and the outlet 22 of which conveys the exhausted and collected combustion fumes to a fume treatment centre (FTC) 23, shown diagrammatically in FIG. 3 and in greater detail in FIG. 4.

The FTC 23 is an installation for scrubbing the fumes from the BF 1 and performs the following functions:
exhausting the baking fumes emitted by the BF 1, with an almost constant controlled negative pressure, cooling the fumes, dry scrubbing of these fumes in order to eliminate the fluorine, dusts and tars contained therein, these pollutant elements being captured in a form that allows for them to be recycled in the aluminium electrolysis cells, and discharging the scrubbed fumes into the atmosphere.

The dry scrubbing method is based on the capacity of a powder reagent, generally alumina, to provide physico-chemical neutralization of these pollutants by capturing the fluorine and unburned hydrocarbons by adsorption or catchment. The powder alumina is injected into the stream of combustion fumes originating from the BF 1, then retained in filters at the same time as the dusts, after adsorption and/or catchment of the majority of the pollutants:

tars, fluorine gas, sulphur dioxide ($SO_2$). The tar filtration efficiency is higher where heavy elements are concerned (having a high molecular weight, therefore easily condensable), while light tars (not condensed) are contained to a lesser extent. The loaded alumina, recovered by emptying the filters, is then recycled in part by being mixed with fresh alumina and reinjected into the stream of fumes originating from the BF 1, and for the remainder by being sent to the aluminium electrolysis cells, where the combustible elements retained in the loaded alumina are burned, and the fluorine recycled in a directly usable form.

The combustion fume scrubbing functions provided by the FTC 23 are, in order:

cooling, in a cooling tower 24, of the stream of combustion fumes originating from the BF 1, supplying at least one reactor 25, but preferably several reactors 25 in parallel, with powder alumina (fresh and recycled), injection of alumina into each reactor 25 with distribution in a stream of combustion fumes passing through the reactor, catchment-adsorption of the pollutants by the powder alumina distributed in said stream, filtration of the alumina loaded with the pollutants and dusts from said stream, recycling of the loaded alumina, by cleaning the filters and removal of the loaded alumina.

Cooling the fumes consists of reducing their temperature to approximately 100° C. in order to cause condensation of the heaviest and most dangerous unburned hydrocarbons present in these fumes and reduce the temperature of the fumes to a temperature acceptable by the filtration media. This cooling is carried out by total evaporation of water injected in fine droplets in the tower 24 by sprays, as shown diagrammatically by 26, supplied with water by a valve 27 and with air for spraying by a flue 28 opening into the water pipe between the valve 27 and the spray 26. This fine spray makes it possible to obtain total evaporation of the injected water and thus to avoid the formation of hydrofluoric acid (HF) or sulphuric acid ($H_2SO_4$) by condensation on the internal walls of the tower 24. As shown in the attached FIG. 8, which is a diagrammatical representation of the control of the flow rate of the cooling water valve 27, this flow rate can, in the state of the art, be controlled by a control loop, which is a feedback loop, in order to tend to keep the temperature of the fumes at outlet of the cooling tower 24, and measured by a temperature sensor 29, at a constant value, aligned on a temperature set point, such that a regulator, which is sensitive to a signal indicating an error between the set point and the temperature measured by the sensor 29, controls an actuator 30 to operate the water flow rate valve 27.

There are several types of the regulations, all of which have the aim of injecting a controlled quantity of water, but which, in order to guarantee a good droplet size, use different principles (regulation of the water pressure and constant air pressure, regulation of both pressures at the same time, regulation of the flow rates, etc.).

The circuit to supply the reactors 25 with fresh alumina mainly comprises a storage silo 31 that in turn supplies, downstream, a screening 32 and metering 33 system, the outlet of which is linked to a distribution system 34 (the metering 33 and distribution 34 systems can be grouped together in a single device), ensuring the even distribution of the fresh alumina to the different reactors 25, and airslides 35 supplied with fluidization air (or any other handling means), in a number equal to the number of reactors 25, and each of which respectively supplies one of the reactors 25 with fresh alumina.

Catchment of the tar vapours and fluorine gas by the alumina corresponds precisely to the conjunction of two different phenomena, which are a mechanical catchment of surface tar droplets and adsorption of tar and fluorine vapours inside the pores of the alumina particles.

This catchment takes place in the reactors 25, in general vertical and having a cylindrical shape or a circular or rectangular cross section. The alumina is injected into each reactor 25 in the most homogenous fashion possible, in order to reduce the average distance between the molecules to be captured and the alumina grains.

After this injection, filtration of the loaded alumina and dusts is provided by the filter cake which forms in the filters 36, generally produced on fabric filter tubes. The cleaning of the filters 36 by blowing air at low pressure, intermittently and in the opposite direction (counter-current to the stream to be filtered), is controlled by the pressure loss of the filters 36 or by a timer. The loaded alumina falls into a fluidized bed maintained in bins 37 of the filters 36, from where a part of this loaded alumina is then reinjected into the reactors 25 while being mixed with fresh alumina supplied by the corresponding airslide 35, and a part is discharged by an overflow onto an airslide 38 that removes it to a silo 39 for recovery of loaded alumina.

The recycling of loaded alumina in the reactors 25 is implemented in order to increase the efficiency of the catchment function.

Currently, the command and regulation system for the BF 1 and the command and control system for the FTC 23 operate independently of each other.

As a result, in particular, the operation of the FTC 23 is not necessarily optimized given, in particular, variable or even rapidly variable conditions of flow rate and/or temperature and/or degree of pollution of the combustion fumes at the outlet of the BF 1 and in the fume main 20, as well as in the extension 20' of such fume main, downstream of the outlet 22 of the fume flue 21, providing the link with the FTC 23. In particular, for reasons of scrubbing safety, the flow rate of the water sprayed into the cooling tower 24 and/or the flow rate of the reagent, for example alumina, but which can equally be another adsorbent, is adjusted to suit the least favourable conditions of pollution, temperature and flow rate in particular of the baking fumes at the outlet of the BF 1.

The problem on which the invention is based is the optimization of the command and control of the FTC 23 in accordance with the operating conditions of the BF 1, and the idea on which the invention is based is to propose a method of optimizing the control of a FTC 23 taking into account interactions between the operation of the BF 1 and the FTC 23, so that, in particular, the implementation of the method according to the invention allows for the putting in place of automatic interactions between the command and control systems of the BF 1 and the FTC 23, using, as far as possible, for the command and control of the FTC 23, data known from the command and control system of the BF 1 that relates to operating parameters of the BF 1. As a result, the implementation of the method of optimizing the control of the FTC 23 is greatly facilitated by the sending of information from the command and control system of the BF 1 to the command and control system of the FTC 23.

To this end, the method of optimizing the control of a FTC of the type described above, intended to scrub baking fumes originating from a BF of the type also described above, is characterized in that it comprises at least the steps consisting of regulating the water flow rate in the cooling tower and/or regulating the flow rate and/or recycling rate of the reagent in said at least one reactor, in accordance with at least one parameter indicating a fume pollution level at the intake of the FTC.

In the event of a variation in the nominal operating flow rate of the FTC, the water flow rate in the cooling tower and/or the fresh reagent flow rate and/or the recycled reagent flow rate will vary in correlation with the variation in said nominal operating flow rate of the FTC (variation in the flow rate of the treated fumes).

Thus, the method according to the invention allows for the putting in place of a regulation strategy for the FTC with the aim of optimizing reagent consumption (fresh alumina) and/or the temperature of the fumes in the cooling tower, in order to reduce reagent consumption and/or optimize the capture of pollutants.

As has already been mentioned above, in the reminder of the structure and operation of a BF of the type to which the invention relates, volatile organic components originating from the pitch contained in the carbonaceous blocks are emitted during baking in the chambers in the preheating phase, and are therefore, at least partly, present in the baking fumes in the fume main.

The inventors of the method according to the invention have noted that carbon monoxide (CO) is a gas that typically results from incomplete combustion, and therefore constitutes an indicator of the pollutant content of the baking fumes at the intake of the FTC. The pollution level of the fumes at the intake of the FTC can therefore be correlated with the CO content measured in the baking fumes at the outlet of the BF.

Consequently, the method according to the invention also comprises the step consisting of adopting the carbon monoxide (CO) content of the fumes at the outlet of the BF as a parameter indicating the pollution level of said fumes at the intake of the FTC.

Advantageously, the method also consists of considering that the CO content of the baking fumes at the outlet of the BF is the content measured in at least one exhaust manifold of the BF or the weighted average of the CO contents measured in each of the exhaust manifolds in operation or the CO content measured in the fume flue at the furnace outlet.

Thus, the method according to the invention also advantageously comprises the steps consisting of determining the CO content of the fumes at the outlet of the BF, and varying, in the FTC, the fresh reagent flow rate and/or the recycled reagent flow rate (or the recycling rate of the reagent) in said reactor in accordance with the CO content, so as to optimize the quantity of reagent used in accordance with the pollution level of said baking fumes at the outlet of the BF.

In practice, the fresh reagent (alumina) flow rate and/or the recycled reagent (alumina) flow rate (or the recycling rate of the reagent) is/are controlled in said at least one reactor in accordance with at least one threshold of CO content in the baking fumes at the outlet of the BF.

Advantageously, according to one embodiment of the method that only involves a small number of CO content thresholds but that is however highly efficient, the method also consists of defining three pollution levels using two different CO content thresholds, namely a lower threshold ($S_{CO1}$) and an upper threshold ($S_{CO2}$) (where $S_{CO2}>S_{CO1}$), considering the pollution level of said baking fumes low if the CO content is the lower threshold, and in this case controlling the operation of the FTC in nominal mode defined by a nominal fresh reagent (fresh alumina) flow rate and a recycling rate that are constant, considering the pollution level medium if the CO content is between the lower and upper thresholds, and, in this case, controlling an increase or reduction in the reagent recycling rate in accordance with the increase or reduction in the CO content and a supply of fresh reagent at a constant flow rate, as long as the maximum recycling rate has not been reached, and considering the fume pollution level high if the CO content is the upper threshold, and in this case controlling said reactor with a maximum reagent recycling rate and fresh reagent flow rate.

In addition, when the pollution level is medium and if the maximum reagent recycling rate has been reached, the method furthermore consists of increasing the fresh reagent (fresh alumina) flow rate in accordance with the increase in CO content.

Advantageously, the method according to the invention also comprises, when the pollution level is high, a step consisting of lowering the temperature set point of the baking fumes in the cooling tower, which encourages improved condensation of the polluting volatile fractions present in the combustion fumes at the intake of the cooling tower of the FTC.

Similarly, in order to take account of the temperature of the baking fumes at the outlet of the BF, which can vary rapidly and/or considerably, depending on the operating configurations and conditions of the BF, the method according to the invention also comprises a step of anticipatory correction or compensation of regulation of the cooling water flow rate in accordance with the temperature of said baking fumes measured at the outlet of the BF, for example in at least one exhaust manifold of the BF.

The method according to the invention can use a known technical measure, namely that the output flow rate of a water supply valve of the cooling tower is modulated by a feedback loop that tends to align the temperature of the fumes detected at the outlet of the cooling tower on a temperature set point, as already mentioned above, but, in this case, it advantageously also comprises the addition of compensation by a predictive control loop in accordance with the temperature of the fumes measured at the outlet of the BF or at the intake of the cooling tower, which anticipates the control of the water flow rate injected into the cooling tower in accordance with said temperature of the fumes at the outlet of the BF or at the intake of said tower, by applying to the command originating from the feedback loop a positive or negative command variation resulting from said predictive control loop.

However, compensation by the predictive control loop is disabled when an auxiliary burner (used to increase the temperature of the fumes when it is too low, with the aim of preventing the condensation of the tars on the internal walls of the flues), arranged at the outlet of the fume main, upstream of the cooling tower, is in operation. The auxiliary burner comes into operation to increase the temperature of the fumes at the intake of the cooling tower, such that the simultaneous operation of the predictive control loop would have the opposite effect to the one desired and created by the operation of the auxiliary burner.

As a variant to the step of compensation by predictive control loop of the cooling water flow rate in the tower, the method according to the invention can also comprise, in addition, at least one step of calculation (looped) of the required flow rate of water injected into the cooling tower to regulate the temperature of the fumes at the outlet of said tower, the calculation of the required water flow rate being based on the values of the flow rate and temperature of the fumes at the outlet of the BF 1 and optionally the flow rate and temperature of the recirculation fumes, and of the temperature set point of the fumes at the outlet of the cooling tower, the flow rate calculation being adjusted by a correction factor that is a function of the deviation between said set point and the temperature measurement at the outlet of the tower.

Also in this case, the calculation loop for the required water flow rate is disabled when an auxiliary burner, arranged at the outlet of the fume main, upstream of the cooling tower, is in operation.

Furthermore, to take into account certain specific operating configurations of the BF, the method according to the invention proposes a strategy of modulation of the flow rate of water distributed in the cooling tower and, to this end, the method also comprises at least one step consisting of reducing and then, after a predetermined time interval, increasing the flow rate of water distributed in said cooling tower when a reduction and then a considerable and rapid increase in the temperature and/or flow rates of said baking fumes are expected, as a result of at least one specific configuration of the BF comprising at least one switch of at least one fire of the BF, a crossover of at least one fire of the BF and an immobilization of at least one fire of the BF.

Moreover, the method can advantageously comprise at least one step consisting of recirculating some of the treated fumes by reinjecting them upstream of the cooling tower if the predicted flow velocities of said fumes in the fume main are too low for satisfactory supply of the FTC, and optionally a step consisting of reducing the temperature of the fumes by the admission of conditioning air in order to improve the catchment efficiency.

As already mentioned above, some of the parameters necessary for the implementation of the method according to the invention take values that are measured and, most frequently, also recorded during the operation of the BF, such that the method according to the invention also consists of controlling the FTC using information sent from at least one command and regulation system of the BF to at least one command and control system of the FTC, relating to the temperature and/or CO content and/or flow rate of the baking fumes at the outlet of the BF, in order to enable the optimization of the control of the FTC in accordance with the data sent by the BF regulation system.

As a result, the method according to the invention can be implemented practically without the addition of additional measuring instrumentation, when the BF 1 is equipped with CO content measurement, at the exhaust manifold(s) and/or the fume flue and/or the outlet of the BF 1, but simply through the selective sending of information relating to measurement data of certain parameters of the BF, which are known from its command and regulation system, to the command and control system of the FTC so that the operation of the latter is better suited to the real-time operation of the BF. If not, the BF 1 and/or the intake of the FTC must be equipped with such CO content measurement.

Figure 5:
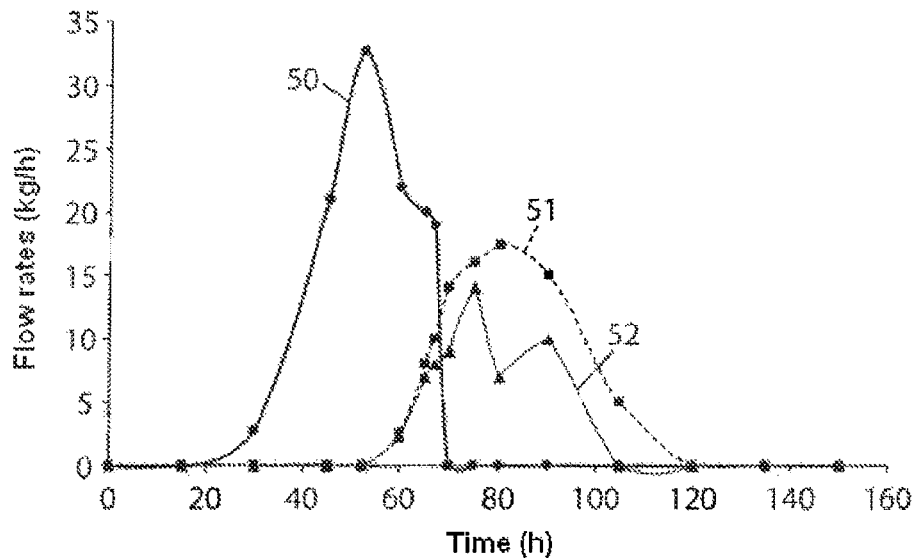
Figure 6:
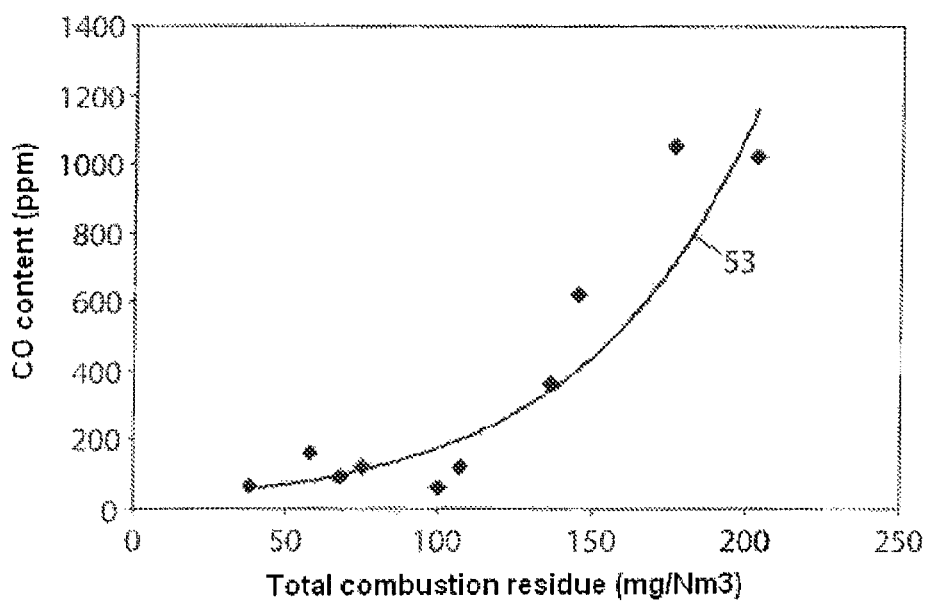
Figure 7:
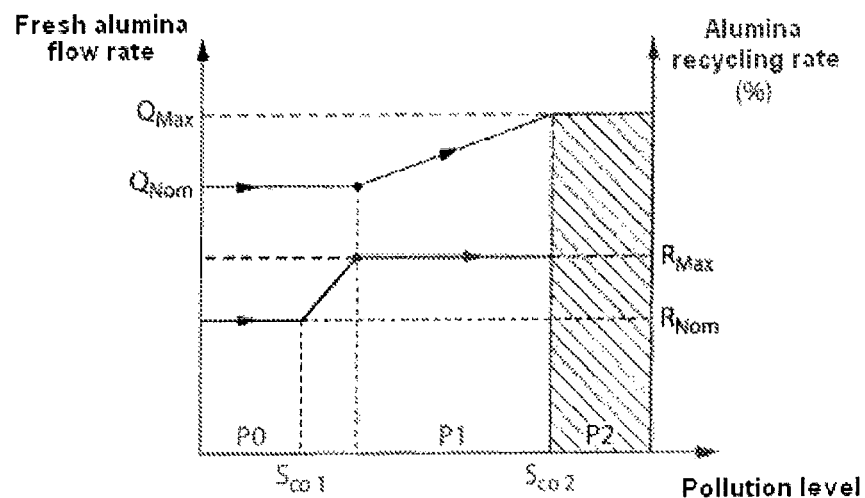
Figure 8:
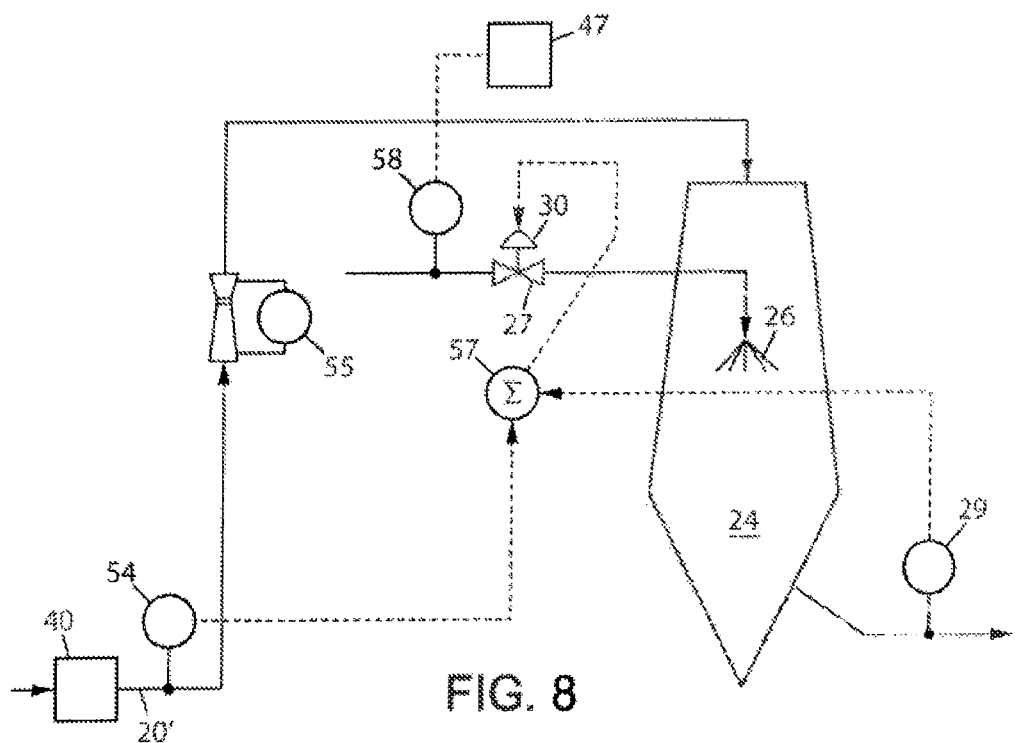
Figure 9:
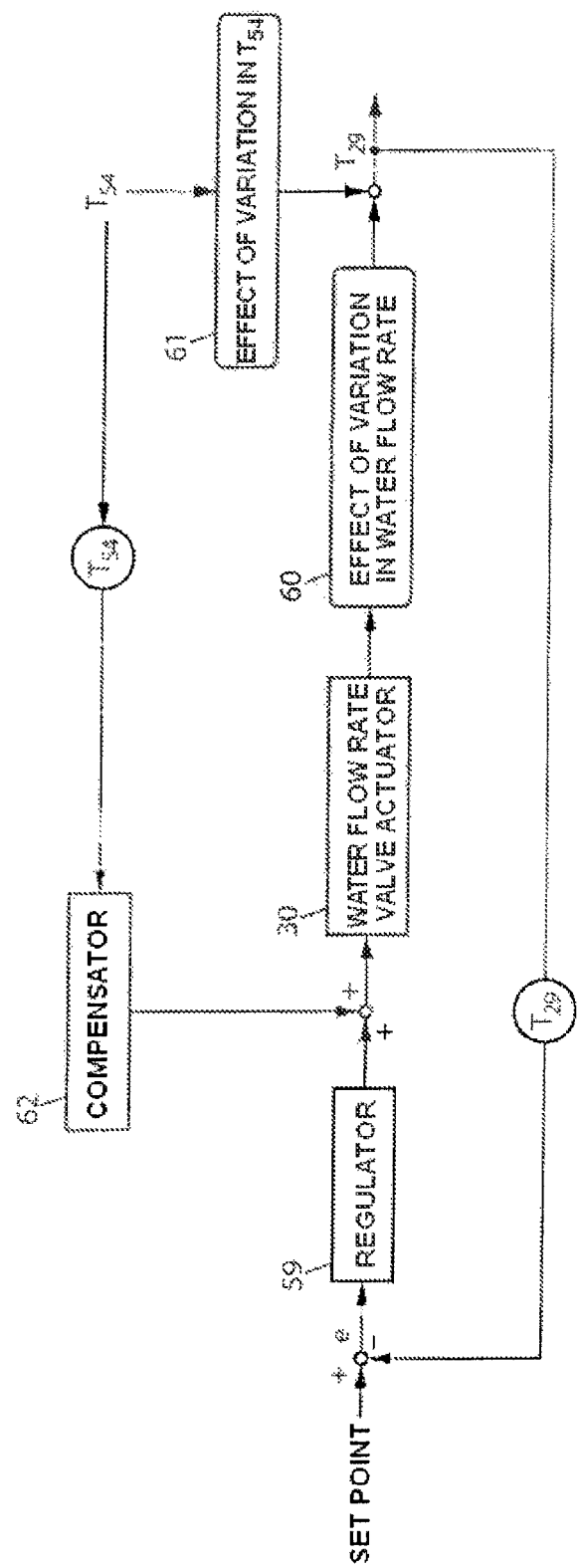

Further characteristics and advantages of the invention will become apparent from the non-limitative description given below of an embodiment described with reference to the attached drawings, in which:

FIGS. 1 and 2 are diagrammatic views, respectively a plan view and a partial perspective view with cutaway, of a BF of the type to which the invention relates, which have already been described above, FIG. 3 is a diagrammatic plan view, similar to FIG. 1, of the BF in FIG. 1, the command and regulation system of which cooperates with that of a FTC of the type to which the invention relates and also shown diagrammatically in a plan view in FIG. 3, FIG. 4 is a diagrammatic side elevation of a FTC of the type to which the invention relates, already described above, FIG. 5 is a curve relating to the evaporation rate of volatile components emitted by a carbonaceous block such as an anode during preheating and then baking in a BF according to FIGS. 1 and 2, as a function of time, FIG. 6 is a curve indicating the CO content as a function of the combustion residue content (insoluble particles and components) in the baking fumes at the outlet of the BF, FIG. 7 is a diagram showing the fresh alumina flow rate together with the alumina recycling rate in accordance with the pollution level, in an example of the method according to the invention with two CO thresholds, FIG. 8 is a representative diagram of the water flow rate control loops of the cooling tower of the FTC in accordance with two temperature measurements, upstream and downstream of the tower respectively, and FIG. 9 is a block diagram of the two control loops for the water flow rate valve in FIG. 8.

FIG. 3 is a diagrammatic representation in plan view of an installation combining a BF 1, as previously described with reference to FIGS. 1 and 2, and a FTC 23, as previously described with reference to FIG. 4, the FTC of which, according to the invention, comprises additional equipment, specified below, in addition to the intercommunication between the command and control systems of the BF 1 on the one hand and of the FTC 23 on the other, for the implementation of the method according to the invention.

In FIG. 3, the fume main 20 is only partly shown, and is extended, beyond the outlet 22 of the fume flue 21, by a section 20' of the fume main connecting this outlet 22 to the intake of the cooling tower 24, for the supply of the FTC 23 with fumes to be scrubbed, the stream of cooled fumes at the outlet of the tower 24 being, as shown in FIG. 4, sub-divided into four streams, each of which is respectively taken in to one of four reactors 25 respectively for putting the fumes in contact with powder alumina, such that after they have passed through the reactor 25 and the corresponding filter 36 (see FIG. 4), the scrubbed fumes are discharged by induced draught fans 41 and a scrubbed fume flue 42, into a stack 43.

The command and control system 44 of the BF 1 receives signals, via a communication network 45 and 46, representing the CO contents, temperatures and flow rates of the baking fumes. The CO contents and the temperatures TASP of the baking fumes at the outlet of each exhaust manifold 11 can be measured in the downstream end part of each exhaust manifold 11, between its connection to the fume main 20 and the exhaust pipe 11*a* closest to said fume main. The CO content and the temperature of the baking fumes at the outlet of the BF 1 can be calculated for example by calculating the weighted average of the CO contents and temperatures of the fumes, measured using CO detectors 14 and temperature sensors 13 in accordance with the flow rate in each exhaust manifold 11. The flow rates of the baking fumes extracted from each exhaust manifold 11 can be calculated by the corresponding flow meter 12 adding together the flow rates measured in each exhaust pipe 11*a* of the corresponding exhaust manifold 11.

As a variant, the CO content and temperature of the baking fumes can be measured and recorded from at least one CO analyser-detector and at least one temperature sensor arranged in the fume flue 21, near its outlet 22 or slightly downstream of such outlet 22, in the section 20' of the fume main providing the connection to the FTC 23.

Each of the command and control systems 44 and 47 comprises at least one automatic control unit comprising programmable logic controllers, in a well-known manner.

The system 47 takes into account the signal identified as representing the CO content of the fumes at the outlet of the BF 1 as the parameter indicating the pollution level of the fumes at the intake of the FTC 23.

The system 47 optimizes the control of the FTC 23 by regulating, on the one hand, the flow rate of the water supply valve 27 for the cooling tower 24, and on the other hand, the alumina flow rate and/or recycling rate in each of the reactors 25, in accordance with the CO content of the fumes, which is taken into account as an indicator of the pollution levels of such fumes.

In particular, the system 47 controls the variation, in each of the reactors 25 of the FTC 23, of the fresh alumina flow rate supplying said reactor 25 by means of metering 32 and distribution 34 devices, as well as the charged alumina recirculation flow rate by means of controlling the recycling valve 49, or any other means of varying such charged and recycled alumina flow rate, on a recycling pipe connecting the bin 37 located at the bottom of the filter 36 to the reactor 25. In this way, the system 47 can control the optimization of the quantity of fresh alumina used in accordance with the pollution level of the baking fumes at the outlet of the BF 1.

Classifying the carbon monoxide (CO) content of the fumes at the outlet of the BF 1 as a parameter representing the pollution level of the fumes at the intake of the FTC 23 is justified by the curves in FIGS. 5 and 6.

FIG. 5 shows the evaporation rates of three main volatile components emitted by an anode 5 during its preheating and baking in the BF 1, and, for each of these three volatile components, FIG. 5 gives on the y-axis the flow rates of these components expressed in kilograms per hour (kg/h), as a function of time on the x-axis, expressed in hours (h). The curve 50, which has the highest peak, corresponds to pitch vapours, while the curve 51, in dotted lines and with a medium-amplitude peak, corresponds to hydrogen, and the curve 52, with two lower-amplitude peaks, corresponds to methane.

As the baking cycle of an anode lasts, as has already been mentioned, in the region of one hundred hours, and as these volatile components are combustible, it is understood that most of these will be burnt in the BF 1 and will contribute significantly (about half) to the heat production necessary for the baking of the anode. Nonetheless, the resulting combustion fumes contain combustion residue, particularly solid particles and polycyclic aromatic hydrocarbons in condensed and uncondensed form, and the curve 53 in FIG. 6, which expresses the CO content (in ppm) as a function of the combustion residue content of the fumes (total particles and uncondensed parts, expressed in standardized mg/Nm$^3$), clearly shows the correlation between the CO content and the degree of pollution of the baking fumes, these two quantities being linked to each other by a continuously increasing function corresponding to the curve 53.

In practical terms the control system 47 of the FTC 23 can correlate the pollution level of the fumes at the intake of the FTC 23 to at least one and preferably several predefined thresholds of CO contents measured and recorded at the outlet of the BF 1, and control the fresh alumina flow rate and the alumina recycling rate in each reactor 25 in accordance with one or more thresholds of CO content in the baking fumes at the outlet of the BF 1.

In a particular embodiment, now described with reference to FIG. 7, the method only uses two CO thresholds, a lower threshold $S_{CO1}$ and an upper threshold $S_{CO2} > S_{CO1}$, by means of which three pollutions levels are defined, namely a low level P0, when the CO content is $\leq S_{CO1}$, a medium pollution level P1, when the CO content is between $S_{CO1}$ and $S_{CO2}$, and a high pollution level P2 if the measured CO content is $S_{CO2}$, as shown on the x-axis of the diagram in FIG. 7.

When the pollution level is low P0, the command and control system 47 of the FTC 23 controls the operation of the FTC in nominal mode, defined by a nominal fresh alumina flow rate $Q_{Nom}$, as shown on the left-hand y-axis in FIG. 7, and a nominal alumina recycling rate $R_{Nom}$, as shown on the right-hand y-axis in FIG. 7, such nominal flow rate and nominal recycling rate being constant.

If the pollution level is medium P1, the system 47 controls a variation in the recycling rate in accordance with an increasing function, for example linear, of the CO content, until the maximum recycling rate $R_{Max}$ is reached, for an intermediate CO content value between the thresholds $S_{CO1}$ and $S_{CO2}$, while the fresh alumina flow rate injected remains constant and therefore equal to the nominal flow rate $Q_{Nom}$ up to the intermediate CO content value for which the maximum recycling rate $R_{Max}$ is reached. Beyond this intermediate CO content value, above which the recycling rate remains at a maximum $R_{Max}$, the fresh alumina flow rate varies in accordance with an increasing function, for example linear, of the CO content, up to the upper threshold $S_{CO2}$, as shown in FIG. 7.

If the pollution level is high P2, the alumina recycling rate and the fresh alumina flow rate are kept constant at their maximum plateau, $R_{Max}$ and $Q_{Max}$ respectively. Furthermore, in order to encourage improved condensation of the polluting volatile fractions present in the fumes entering the FTC 23, the temperature set point of the fumes at the outlet of the cooling tower 24, taken into account in the feedback loop described above and compared with the temperature of the fumes measured by the temperature sensor 29 at the outlet of the tower 24, is lowered. Initially, the feedback loop is sensitive to a larger error signal, corresponding to the deviation between the set point and the temperature $T_{29}$ measured by the sensor 29 at the outlet of the tower 24, to control an increase in the sprayed water flow rate delivered by the valve 27.

In FIG. 7, the hatched rectangle corresponds to the high pollution level P2 zone, for which action is controlled on the temperature set point of the fumes in the tower 24.

But furthermore, there is an anticipatory correction in addition to the correction by the feedback loop on the regulation of the water flow rate injected by the valve 27 into the cooling tower 24, in accordance with the temperatures of the fumes TASP measured in exhaust pipes 11a of the exhaust manifolds 11 of the BF 1 by the temperature sensors 13 (see FIG. 2), or measured at the outlet of the BF 1 (for example by one or more temperature sensors installed at the outlet 22 of the fume flue 21), or even measured by a temperature sensor 54 at the intake of the FTC 23, and more specifically upstream of the intake of the cooling tower 24, between the auxiliary burner 40 and a flow meter 55 installed in a riser duct for supplying the cooling tower 24 with combustion fumes, such flow meter 55 itself being upstream of the arrival, in such duct, of a pipe 56 equipped with a damper 56a controlled, by the line 56b, in accordance with the flow rate measured by the flow meter 55, for the recirculation of the scrubbed fumes from the pipe 42, in order to ensure minimum velocity of the gases in this riser duct supplying the tower 24.

This correction, in accordance with the exhaust temperature TASP of the combustion fumes or the temperature given by the sensor 54, allows for the control of the water flow rate injected by the valve 27 into the tower 24 to be anticipated, in order to reduce the risk of dampening the internal side walls and the bottom of the cooling tower 24 by excessive spraying. This anticipatory control consists of applying to the command originating from the feedback loop of the state of the art, a positive or negative variation command, which is the result of the predictive control loop causing a compensatory effect, the input variable of the predictive control loop being the measurement of the fume temperature, that is either the temperature at the outlet of the BF or the temperature $T_{54}$ of the sensor 54 upstream of the tower 24, and the command from the predictive control loop is added to the command from the feedback loop at the summing element 57 shown diagrammatically in FIG. 8, to control the actuator 30 of the water flow rate valve 27, such water flow rate being known by the control system 47 by means of a flow meter 58 on the water pipe upstream of the valve 27.

FIG. 9 shows the block diagram of the overlaying of the two feedback and predictive control loops, the first comprising the measurement of the temperature T29 by the temperature sensor 29 at the outlet of the cooling tower 24, the corresponding signal of which is subtracted from the temperature set point to generate an error signal "e" and entered into a regulator 59 downstream of the summing element 57 that controls the actuator 30 of the water flow rate valve 27 to produce an effect of variation of the water flow rate represented by the block 60, that is, a variation in the temperature of the fumes in the tower 24, such variation being detected at the outlet of the tower 24 by the sensor 29, the effect of the variation of the temperature T54 measured by the sensor 54 upstream of the tower 24, and as represented by the block 61, being added to the effect of the block 60 upstream of this temperature measurement by the sensor 29, as a result of the effect of the compensator represented in block 62 and added to the control of the regulator 59 at the summing element 57.

However, the compensator 62 of the predictive control loop is disabled when the auxiliary burner 40 on the outlet of the fume main 20' and upstream of the temperature sensor 54 of the FTC 23 is in operation, as the compensator 62 has the opposite effect to the auxiliary burner 40, the function of which is to increase the temperature of the combustion fumes at the intake of the cooling process, if necessary.

As a variant, the regulation of the water flow rate injected into the cooling tower 24, to regulate the temperature of the fumes at the outlet of the tower 24, can be carried out from the calculation (looped) of the water flow rate required based on the values of the flow rate and temperature of the fumes at the outlet of the BF 1, and, optionally, on the recirculation fume flow rate and temperature values (in the pipe 56), and the temperature set point of the fumes at the outlet of the cooling tower 24. The calculation of the water flow rate is adjusted by a correction factor that is a function of the deviation between the set point and the measured temperature of the fumes at the outlet of the tower 24. The correction factor allows, in reality, for the heat capacity of the fumes, which depends on their actual composition, to be taken into account.

Also in this variant, when the auxiliary burner 40 at the outlet of the fume main 20-20', upstream of the temperature sensor 54 (see FIG. 8) and the intake of the cooling tower 24, is operating, the calculation loop for the required water flow rate is disabled.

The command and control system 47 of the FTC 23 also controls the adaptation of the operating modes of the FTC 23 to specific operating configurations of the BF 1 during the baking of the anodes, and in particular to fire switching, crossovers and fire immobilizations.

In the BF 1, fire switching is an operation of fire advance from a first chamber 2 to a second chamber 2 immediately downstream of the first chamber 2 with respect to the direction of the fumes, and during which the exhaust manifolLa-Camera1 of the corresponding fire is disconnected then reconnected to the fume exhaust main 20. It is understood that fire switching generates a drop in the temperatures of the fumes, as well as variations in the exhaust flow rates.

A crossover is a configuration or situation during which a fire is distributed over the two sections 1a and 1b of the BF 1, i.e. some of the manifolds and ramps 11 to 19 of this fire are above chambers 2 of a section 1a or 1b, and other manifolds and ramps are above chambers 2 of the other section 1b or 1a. This "fire", i.e. this set of manifolds and ramps, is therefore subject to heat losses and additional pressure losses corresponding to the passage and mixing of fumes in the crossover 10 concerned. During a crossover, the flow rates of the fumes and the temperature gradients can be reduced.

A fire immobilization corresponds to a specific procedure allowing fire advance to be stopped and the manifolds and ramps 11 to 19 of a fire to be immobilized on the same chambers 2 for a period of up to several days. This procedure implements a substantial reduction in the exhaust flow rates, a stoppage of the blowing and cooling areas, as well as a limitation of the injection of fuel in the heating area.

Consequently, during a fire immobilization, the temperature and the flow rate of the fumes at the outlet of the BF 1 and at the intake of the FTC 23 are very significantly reduced.

Of these three specific configurations, fire switchings and crossovers are periodic processes during the baking of the anodes, the occurrence of which is scheduled and recorded by the command and regulation system 44 of the BF 1. Conversely, fire immobilizations are specific configurations that can be recorded by the same system 44.

Consequently, based on the information gathered and centralized by the system 44 relating to these specific configurations, and due to the communication between the command and control systems 44 and 47 of the BF and the FTC 23, the system 47 can control the triggering of specific operating modes of the FTC 23 in order to anticipate the variations in flow rate and temperature of the fumes at the intake of the FTC 23, so as to achieve the principal result consisting of preventing the risk of damping of the internal side walls and bottom of the cooling tower 24 by excessive spraying of the fumes, which have suddenly become cooler due to the BF 1 having switched to one of the aforementioned three specific configurations.

Thus, the control system 47 of the FTC 23 can control a reduction and then an increase, after a predetermined time interval, in the water flow rate distributed by the valve 27 in the cooling tower 24, when a reduction and then a considerable and rapid increase in the temperature and/or flow rates of the baking fumes at the outlet of the BF 1 are expected at the FTC 23, the control system 47 of which has received corresponding information from the control system 44 of the BF 1, as a result of fire switching, crossover or fire immobilization in the BF 1.

For example, during fire changing or switching, the exhaust flow rate of the fumes, seen from the FTC 23, is reduced by a percentage within a predetermined range, known in particular empirically from the recordings during previous fire changes. As the duration of such a reduction in the exhaust flow rate is also known in advance (also due to recording during previous fire changes), the control system 47 of the FTC 23 can predict with certainty the necessary reduction in the water flow rate and therefore control it, and can simultaneously increase the recirculation of the combustion fumes by the pipe 56 at the intake of the cooling tower 24, if the predicted velocities of flow of the fumes in the fume main 20-20' are too low for the satisfactory supply of the FTC 23, in which the admission of conditioning air through an inlet 63 (see FIG. 4), into the fumes at the intake of the reactors 25, in order to cool the fumes down to a more appropriate temperature for the treatment they are to undergo in the reactors 25 and filters 36, is already known.

All of these actions can be controlled by the system 47 and applied quickly as soon as a fire change starts, without introducing any delay in the obtaining of the desired effects on the treated fumes, by means of a faster feedback loop with no pumping phenomenon.

The method according to the invention can be implemented without requiring any significant investment in equipment when the BF is equipped with baking fume CO content and flow rate measuring facilities, as it allows for the FTC 23 to be controlled using information sent from the command and regulation system 44 of the BF 1 to the command and control system 47 of the FTC 23, such information relating to at least the temperature and/or CO content and/or flow rate of the baking fumes at the outlet of the BF 1, in order to enable the optimization of the control of the FTC 23 in accordance with the data sent by the command and regulation system 44 of the BF 1.

The invention claimed is:

1. A method of controlling of a fume treatment centre (FTC), for scrubbing baking fumes originating from a baking furnace (BF) for carbonaceous blocks, said BF being a baking furnace of the "ring" type, the baking fumes of which are extracted by at least one exhaust manifold of said BF and collected in a fume main conveying said fumes to said FTC comprising a tower for cooling said fumes by spraying water into said fumes at an outlet of said fume main, and at least one reactor for the physico-chemical neutralization of said fumes by putting said fumes in contact with a powder reagent, then filtering loaded reagent and fume dust, recycling in said reactor of at least one fraction of filtered reagent, and mixing of said fraction with fresh reagent, said method comprising:
adopting a carbon monoxide (CO) content of said fumes at an outlet of said BF as a parameter indicating a pollution level of said fumes at an intake of said FTC;
performing at least one step selected in the group consisting of:
regulating a water flow rate in said cooling tower and
regulating a reagent flow rate and a reagent recycling rate in said reactor,
in accordance with at least one parameter, including the CO content, and indicating a pollution level of said fumes at an intake of said FTC;
determining said CO content of said fumes at said outlet of said BF;
varying, in said FTC, one at least of said fresh reagent flow rate and said recycled reagent flow rate in said reactor in accordance with said CO content, so as to optimize a quantity of reagent used in accordance with the pollution level of said baking fumes at said outlet of the BF; and
considering that said CO content of said baking fumes at said outlet of said BF is a content measured in at least one exhaust manifold of said BF or a weighted average of CO contents measured in each of exhaust manifolds in operation or a CO content measured in a fume flue at said BF outlet.

2. The method according to claim 1, wherein at least one of said fresh reagent flow rate and said recycled reagent flow rate is controlled in said reactor in accordance with at least one threshold of CO content in said baking fumes at said outlet of said BF.

3. The method according to claim 1, further comprising:
defining three pollution levels using two different CO content thresholds, namely a lower threshold SCO1 and an upper threshold SCO2 where SCO2>SCO1,
considering the pollution level of said baking fumes low if said CO content is≤said lower threshold, and in this case controlling the operation of said FTC in nominal mode defined by a nominal flow rate of fresh reagent and a nominal recycling rate that are constant,
considering said pollution level medium if said CO content is comprised between said lower and upper thresholds, and, in this case, controlling an increase or reduction in said reagent recycling rate in accordance with an increase or reduction in said CO content and a fresh reagent supply at a constant flow rate, as long as a maximum recycling rate has not been reached, and
considering said fume pollution level high (P2) if said CO content is≥said upper threshold, and in this case controlling said reactor with a maximum reagent recycling rate and fresh reagent flow rate.

4. The method according to claim 3, further comprising, when said pollution level is medium and if said maximum reagent recycling rate has been reached, increasing said fresh reagent flow rate in accordance with said increase in CO content.

5. The method according to claim 3, further comprising:
reducing, when said pollution level is high, a temperature set point of said baking fumes in said cooling tower.

6. The method according to claim 1, further comprising an anticipatory correction of the regulation of a cooling water flow rate in accordance with a temperature of said baking fumes measured at said outlet of said BF.

7. The method according to claim 1, further comprising an anticipatory correction of the regulation of a cooling water flow rate in accordance with a temperature of said baking fumes measured at said outlet of said BF, and wherein an output flow rate of a water supply valve of said cooling tower is modulated by a feedback loop that substantially aligns the temperature of said fumes detected at an outlet of said cooling tower on a temperature set point, and the method also comprises the addition of compensation by a predictive control loop in accordance with the temperature of said fumes measured at said outlet of said BF or at an intake of said cooling tower, which anticipates the control of said flow rate of said water injected into said cooling tower in accordance with said temperature of said fumes at said outlet of said BF or at said intake of said tower, by applying a positive or negative command variation resulting from said predictive control loop to the command originating from said feedback loop.

8. The method according to claim 1, further comprising an anticipatory correction of the regulation of a cooling water flow rate in accordance with a temperature of said baking fumes measured at said outlet of said BF, wherein an output flow rate of a water supply valve of said cooling tower is modulated by a feedback loop that substantially aligns the temperature of said fumes detected at an outlet of said cooling tower on a temperature set point, and the method also comprises the addition of compensation by a predictive control loop in accordance with the temperature of said fumes measured at said outlet of said BF or at an intake of said cooling tower, which anticipates the control of said flow rate of said water injected into said cooling tower in accordance with said temperature of said fumes at said outlet of said BF or at said intake of said tower, by applying a positive or negative command variation resulting from said predictive control loop to the command originating from said feedback loop, and wherein said compensation by said predictive control loop is disabled when an auxiliary burner, arranged at said outlet of said fume main, upstream of said cooling tower, is in operation.

9. The method according to claim 1, further comprising at least one step of calculating a required flow rate of water injected into said cooling tower to regulate the temperature of said fumes at an outlet of said tower, the calculation of said required water flow rate being based on values of flow rate and temperature of said fumes at said outlet of said BF, and of a temperature set point of said fumes at an outlet of said cooling tower, said flow rate calculation being adjusted by a correction factor that is a function of the deviation between said set point and a temperature measurement at an outlet of said tower.

10. The method according to claim 1, further comprising at least one step of calculating a required flow rate of water injected into said cooling tower to regulate the temperature of said fumes at an outlet of said tower, the calculation of said required water flow rate being based on values of flow rate and temperature of said fumes at said outlet of said BF, and of a temperature set point of said fumes at an outlet of said cooling tower, said flow rate calculation being adjusted by a correction factor that is a function of the deviation between said set point and a temperature measurement at an outlet of said tower, and wherein a calculation loop of said required water flow rate is disabled when an auxiliary burner, arranged at said outlet of said fume main, upstream of said cooling tower, is in operation.

11. The method according to claim 1, further comprising reducing and then, after a predetermined time interval, increasing a flow rate of water distributed in said cooling tower when a reduction and then a considerable and rapid increase in the temperature and/or flow rates of said baking fumes at said outlet of said BF are expected, as a result of at least one specific configuration of the BF, the at least one specific configuration being at least one of a switch of a fire of said BF from a first chamber of the BF to a second chamber of the BF, a crossover of at least one fire of said BF across sections of chambers of the BF, and an immobilization of at least one fire of said BF.

12. The method according to claim 1, further comprising recirculating some of said treated fumes by reinjecting them upstream of said cooling tower, if predicted velocities of flow of said fumes in said fume main are too low for satisfactory supply of said FTC.

13. The method according to claim 1, further comprising controlling said FTC using information sent from at least one command and regulation system of said BF to at least one command and control system of said FTC relating to at least one parameter selected in the group consisting of a temperature of the baking fumes, the CO content of the baking fumes and a flow rate of said baking fumes at said outlet of said BF, in order to enable optimization of the control of said FTC in accordance with data sent by said command and regulation system of said BF.

14. A method of controlling of a fume treatment centre (FTC), for scrubbing baking fumes originating from a baking furnace (BF) for carbonaceous blocks, said BF being a baking furnace of the "ring" type, the baking fumes of which are extracted by at least one exhaust manifold of said BF and collected in a fume main conveying said fumes to said FTC comprising a tower for cooling said fumes by spraying water into said fumes at an outlet of said fume main, and at least one reactor for the physico-chemical neutralization of said fumes by putting said fumes in contact with a powder reagent, then filtering loaded reagent and fume dust, recycling in said reactor of at least one fraction of filtered reagent, and mixing of said fraction with fresh reagent, said method comprising:
    adopting a carbon monoxide (CO) content of said fumes at an outlet of said BF as a parameter indicating a pollution level of said fumes at an intake of said FTC
    performing at least one step selected in the group consisting of:
    regulating a water flow rate in said cooling tower and
    regulating a reagent flow rate and a reagent recycling rate in said reactor,
    in accordance with at least one parameter, including the CO content, indicating a pollution level of said fumes at an intake of said FTC,
    said method further comprising:
    defining three pollution levels using two different CO content thresholds, namely a lower threshold SCO1 and an upper threshold SCO2 where SCO2>SCO1,
    considering the pollution level of said baking fumes low if said CO content is≤said lower threshold, and in this case controlling the operation of said FTC in nominal mode defined by a nominal flow rate of fresh reagent and a nominal recycling rate that are constant,
    considering said pollution level medium if said CO content is comprised between said lower and upper thresholds, and, in this case, controlling an increase or reduction in said reagent recycling rate in accordance with an increase or reduction in said CO content and a fresh reagent supply at a constant flow rate, as long as a maximum recycling rate has not been reached, and
    considering said fume pollution level high (P2) if said CO content is≥said upper threshold, and in this case controlling said reactor with a maximum reagent recycling rate and fresh reagent flow rate.

15. The method according to claim 14, further comprising, when said pollution level is medium and if said maximum reagent recycling rate has been reached, increasing said fresh reagent flow rate in accordance with said increase in CO content.

16. The method according to claim 14, further comprising:
    reducing, when said pollution level is high, a temperature set point of said baking fumes in said cooling tower.

17. The method according to claim 14, comprising considering that said CO content of said baking fumes at said outlet of said BF is a content measured in at least one exhaust manifold of said BF or a weighted average of CO contents measured in each of exhaust manifolds in operation or a CO content measured in a fume flue at said BF outlet.

18. The method according to claim 14, comprising considering that said CO content of said baking fumes at said outlet of said BF is a content measured in at least one exhaust manifold of said BF or a weighted average of CO contents measured in each of exhaust manifolds in operation or a CO content measured in a fume flue at said BF outlet, and wherein at least one of said fresh reagent flow rate and said recycled reagent flow rate is controlled in said reactor in accordance with at least one threshold of CO content in said baking fumes at said outlet of said BF.

19. The method according to claim 14, further comprising an anticipatory correction of the regulation of a cooling water flow rate in accordance with a temperature of said baking fumes measured at said outlet of said BF.

20. The method according to claim 14, further comprising an anticipatory correction of the regulation of a cooling water flow rate in accordance with a temperature of said baking fumes measured at said outlet of said BF, and wherein an output flow rate of a water supply valve of said cooling tower is modulated by a feedback loop that substantially aligns the temperature of said fumes detected at an outlet of said cooling tower on a temperature set point, and the method also comprises the addition of compensation by a predictive control loop in accordance with the temperature of said fumes measured at said outlet of said BF or at an intake of said cooling tower, which anticipates the control of said flow rate of said water injected into said cooling tower in accordance with said temperature of said fumes at said outlet of said BF or at said intake of said tower, by applying a positive or negative command variation resulting from said predictive control loop to the command originating from said feedback loop.

21. The method according to claim 14, further comprising an anticipatory correction of the regulation of a cooling water flow rate in accordance with a temperature of said baking fumes measured at said outlet of said BF, wherein an output flow rate of a water supply valve of said cooling tower is modulated by a feedback loop that substantially aligns the temperature of said fumes detected at an outlet of said cooling tower, and the method also comprises the addition of compensation by a predictive control loop in accordance with the temperature of said fumes measured at said outlet of said BF or at an intake of said cooling tower, which anticipates the control of said flow rate of said water injected into said cooling tower in accordance with said temperature of said fumes at said outlet of said BF or at said intake of said tower, by applying a positive or negative command variation resulting from said predictive control loop to the command originating from said feedback loop, and wherein said compensation by said predictive control loop is disabled when an auxiliary burner, arranged at said outlet of said fume main, upstream of said cooling tower, is in operation.

22. The method according to claim 14, further comprising at least one step of calculating a required flow rate of water injected into said cooling tower to regulate the temperature of said fumes at an outlet of said tower, the calculation of said required water flow rate being based on values of flow rate and temperature of said fumes at said outlet of said BF, and of a temperature set point of said fumes at an outlet of said cooling tower, said flow rate calculation being adjusted by a correction factor that is a function of the deviation between said set point and a temperature measurement at an outlet of said tower.

23. The method according to claim 14, further comprising at least one step of calculating a required flow rate of water injected into said cooling tower to regulate the temperature of said fumes at an outlet of said tower, the calculation of said required water flow rate being based on values of flow rate and temperature of said fumes at said outlet of said BF, and of a temperature set point of said fumes at an outlet of said cooling tower, said flow rate calculation being adjusted by a correction factor that is a function of the deviation between said set point and a temperature measurement at an outlet of said tower, and wherein a calculation loop of said required water flow rate is disabled when an auxiliary burner, arranged at said outlet of said fume main, upstream of said cooling tower, is in operation.

24. The method according to claim 14, further comprising reducing and then, after a predetermined time interval, increasing a flow rate of water distributed in said cooling tower when a reduction and then a considerable and rapid increase in the temperature and/or flow rates of said baking fumes at said outlet of said BF are expected, as a result of at least one specific configuration of the BF, the at least one specific configuration being at least one of a switch of a fire of said BF from a first chamber of the BF to a second chamber of the BF, a crossover of at least one fire of said BF across sections of chambers of the BF, and an immobilization of at least one fire of said BF.

25. The method according to claim 14, further comprising recirculating some of said treated fumes by reinjecting them upstream of said cooling tower, if predicted velocities of flow of said fumes in said fume main are too low for satisfactory supply of said FTC.

26. The method according to claim 14, further comprising controlling said FTC using information sent from at least one command and regulation system of said BF to at least one command and control system of said FTC relating to at least one parameter selected in the group consisting of a temperature of the baking fumes, the CO content of the baking fumes and a flow rate of said baking fumes at said outlet of said BF, in order to enable optimization of the control of said FTC in accordance with data sent by said command and regulation system of said BF.

* * * * *

UNITED STATES PATENT AND TRADEMARK OFFICE
CERTIFICATE OF CORRECTION

| | | |
|---|---|---|
| PATENT NO. | : 8,679,441 B2 | Page 1 of 1 |
| APPLICATION NO. | : 12/663700 | |
| DATED | : March 25, 2014 | |
| INVENTOR(S) | : Mahieu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this
Ninth Day of June, 2015

Michelle K. Lee
*Director of the United States Patent and Trademark Office*